United States Patent
Wada

(10) Patent No.: US 7,809,612 B2
(45) Date of Patent: Oct. 5, 2010

(54) IMAGE RECEIVING APPARATUS

(75) Inventor: Tetsuya Wada, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 621 days.

(21) Appl. No.: 11/242,338

(22) Filed: Oct. 3, 2005

(65) Prior Publication Data

US 2006/0072161 A1  Apr. 6, 2006

(30) Foreign Application Priority Data

Oct. 4, 2004  (JP)  ............... 2004-291488

(51) Int. Cl.
*G06F 17/30* (2006.01)
*G06Q 30/00* (2006.01)
*G06K 15/02* (2006.01)

(52) U.S. Cl. .............. 705/27; 705/1; 705/10; 705/26; 705/52; 358/1.1; 358/448

(58) Field of Classification Search ........... 348/E5.024; 700/233; 705/17, 24, 37
See application file for complete search history.

(56) References Cited

U.S. PATENT DOCUMENTS

| 5,436,734 | A * | 7/1995 | Yamauchi et al. ........... 358/448 |
| 5,974,401 | A * | 10/1999 | Enomoto et al. ............... 705/40 |
| 6,344,907 | B1 * | 2/2002 | Watanabe et al. ........... 358/448 |
| 6,353,772 | B1 * | 3/2002 | Silverbrook ................. 700/233 |
| 6,714,314 | B1 * | 3/2004 | Ueda .......................... 358/1.15 |
| 6,873,971 | B1 * | 3/2005 | Tackbary et al. .............. 705/27 |
| 6,915,273 | B1 * | 7/2005 | Parulski ........................ 705/26 |
| 7,130,067 | B1 * | 10/2006 | Shibasaki .................. 358/1.15 |
| 7,191,145 | B1 * | 3/2007 | Lunetta et al. ................ 705/26 |
| 7,243,079 | B1 * | 7/2007 | Manolis et al. ............... 705/27 |
| 7,251,044 | B1 * | 7/2007 | Kurashina .................. 358/1.11 |
| 7,536,306 | B2 * | 5/2009 | Ogawa ...................... 705/1.1 |
| 7,562,097 | B2 * | 7/2009 | Shinozaki .......................... 1/1 |
| 7,590,560 | B2 * | 9/2009 | Satomi et al. ................. 705/26 |
| 7,634,425 | B2 * | 12/2009 | Satomi et al. ................. 705/16 |
| 2003/0040921 | A1 * | 2/2003 | Hughes et al. ................ 705/1 |
| 2003/0050893 | A1 * | 3/2003 | Hirabayashi ................. 705/52 |
| 2003/0174215 | A1 * | 9/2003 | Goldsmith .............. 348/222.1 |
| 2003/0233307 | A1 * | 12/2003 | Salvadori et al. ............. 705/37 |
| 2004/0215469 | A1 * | 10/2004 | Fukushima et al. ............ 705/1 |
| 2005/0033658 | A1 * | 2/2005 | Takeuchi et al. .............. 705/26 |
| 2005/0174591 | A1 * | 8/2005 | Sowinski et al. ............. 358/1.9 |

FOREIGN PATENT DOCUMENTS

| EP | 1288715 | * | 3/2003 |
| JP | 200-216920 | | 8/2000 |
| JP | 2003-121946 | | 4/2003 |

* cited by examiner

*Primary Examiner*—F. Ryan Zeender
*Assistant Examiner*—Dana Amsdell
(74) *Attorney, Agent, or Firm*—Knobbe Martens Olson & Bear LLP

(57) ABSTRACT

An image receiving apparatus includes: an image acquisition part for acquiring image data; a display control part 21 for displaying the acquired image data on a monitor screen; an image correction select part 23 for selecting image correction to be made to one frame's worth of image data among the acquired image data; a first charging information display part 24 for displaying charging information on the selected image correction; an order contents determination part for determining order contents for image recording processing based upon all the image data acquired; and a second charging information display part 25 for displaying all the charging information on at least the image correction, prior to determination of the order contents.

17 Claims, 8 Drawing Sheets

Fig.6

For making a red-eye correction 50 yen is charged for a first print and 30 yen for each additional print.

Is it OK?

[OK]   [Cancel]

Charging information

Receipt ID          Date

Total charge    ○○○○ yen

Image correction total    ○○○ yen

Red-eye correction total    ○○○ yen

Trimming total    ○○○ yen (Cancel) ~41

(Cancel)
(Cancel)  } 42

Print size

| Frame number | Image correction | | | | | Print size | |
|---|---|---|---|---|---|---|---|

1  □ ~46    None                              (Cancel) 43    L    (Cancel)

2  □         None                                              L    (Cancel)

3  □         Red-eye correction    (Cancel) 43    L    (Cancel)

4  □         Trimming                                          2L   (Cancel)

...                                                              ...

(Cancel) 40    Order    (OK)

44 (brace grouping Print size Cancel buttons)

IMAGE RECEIVING APPARATUS

BACKGROUND OF THE INVENTION

1. Field of the Invention

The present invention relates to an image receiving apparatus capable of displaying charging information in creating a photo print after receiving image data.

2. Description of the Related Art

As such an image receiving apparatus, for example, a digital image receiving apparatus disclosed in Japanese Patent Laid-Open Publication No. 2003-121946 is known. This image receiving apparatus is in principle operated by a customer for contributing to labor-saving of a photo shop. This apparatus reads image data from a storage medium inserted by a customer and displays an image of the read image data on a display in a thumbnail image form. While looking at the image displayed on the display, the customer sets the number of prints and the like so that processes are performed such as photo print creation and media storage (these processes correspond to image recording).

Since the apparatus is operated by the customer, charging information needs to be presented. In Japanese Patent Laid-Open Publication No. 2003-121946, at the time when a print size is selected in a photo print creation mode, a letter indicating a print size (L, 2L, etc.), a per-print charge and a basic print charge are displayed. Further, in the end of the reception processing, order contents can be confirmed on a screen where a list of details of a print output order and a charged amount is displayed. If there is no error in the display contents, an OK button is cricked so that order information (image data, an order ID, etc.) is stored. Finally, an order certificate is printed and issued, whereby customer information and order information (including an order number and charging information) are printed.

Further, as a system for presenting charging information in a print processing and the like, a charging apparatus disclosed in Japanese Patent Laid-Open Publication No. 2000-216920 or the like is known. This apparatus comprises: history storage means for storing historical information showing edit contents of a document composed of a plurality of editorial processes; means for storing a charge table corresponding to each of the editorial processes; and means for calculating a charge for a document obtained by the editorial processing based upon the history information and the charge table. This system allows confirmation of a charge at any time.

When image recording is to be ordered in the foregoing image receiving apparatus, image correction may be wanted to be made to image data displayed on a monitor screen, in addition to setting the number of prints of that image data. There is for example a case where red-eye correction is wanted to be made, and for that case, a function for making the red-eye correction can be incorporated into the apparatus. There is another case where image correction such as trimming or color correction is wanted to be made. In such image correction, a function prepared exclusively for the correction is used and the process time for the correction is required. It is therefore preferable from the standpoint of the photo shop to impose an additional charge when the customer has selected image correction.

On the other hand, from the standpoint of the customer, the preferable system is one in which charging information on image correction can be previously confirmed and the correction can be cancelled depending upon contents of the charging information. Especially when image correction is made to a plurality of image data, it is necessary to allow the customer to be previously aware of the degree of a total charge for the image correction.

The present invention was made in consideration of the above-mentioned actual conditions, and has an object to provide an image receiving apparatus capable of previously displaying charging information on image correction so as to be confirmed.

SUMMARY OF THE INVENTION

An image receiving apparatus according to the present invention for solving the above-mentioned problem is characterized by comprising: image acquisition means for acquiring image data; display control means for displaying the acquired image data on a monitor screen; image correction select means for selecting image correction to be executed to one frame's worth of image data among the acquired image data; first charging information display means for displaying charging information on the selected image correction; order contents confirmation means for confirming order contents for image recording processing based upon all the image data acquired; and second charging information display means for displaying all the charging information on at least the image correction, prior to confirmation of the order contents.

This image receiving apparatus is capable of acquiring image data and displaying the image data on a monitor screen. When image correction is wanted to be made to one frame's worth of image data among the acquired image data, it is possible to select the kind of image correction to be made. For example, any one kind or a plurality of kinds of image correction can be selected from red-eye correction, backlight correction and the like. Naturally, no correction may be selected when the image correction is unnecessary. When a specific image correction is wanted to be selected, charging information on that image correction is displayed. This allows the customer to be previously aware of a charge for the image correction.

The image receiving apparatus of the present invention comprises order contents determination means for determining order contents of image recording (print creation process, record medium writing process, etc.) based upon image data. Information on a total charge for image correction is displayed prior to the determination. This allows previous awareness of the degree of a charge for image correction, and thus facilitates judgment on whether the procedure should further continue or not. It is to be noted that the second charging information display means may display not only charging information on image correction but charging information on items other than the image correction. Consequently, it is possible to provide an image receiving apparatus capable of previously displaying charging information on image correction so as to be confirmed.

In the present invention, an image receiving apparatus is cited which comprises first cancel means for canceling selected image correction after the display of the charging information by the first charging information display means.

Since comprising the means for canceling image correction after confirmation of the charging information on the selected image correction, the image receiving apparatus is capable of determining whether to perform the image correction or not in view of the charging information.

In the present invention, it is preferable that the image receiving apparatus comprise second cancel means for canceling order contents after the display of the charging information by the second charging information display means.

When it is judged that a charge required for the image correction is too high as looking at the displayed charging information, or other cases, the order contents can be cancelled. Hence it is possible to handle the charge judged as too high, for example by changing the order contents to ones including no image correction prior to actual execution of image recording processing.

It is preferable that the second charging information display means according to the present invention display charging information on image correction per frame. This makes it possible to confirm which frame was subjected to the image correction and charge.

In the present invention, it is preferable that the image receiving apparatus comprise third cancel means for canceling image correction after the display of the charging information by the second charging information display means.

When it is judged that a total charged amount for the image correction is too high after the display of all the charging information, the image correction can be cancelled. This makes it possible to perform the image recording processing while abandoning the image correction.

In the present invention, it is preferable that the image receiving apparatus be set to cancel image correction by frame unit. It is thereby possible to cancel the image correction in accordance with the level of importance of the image so as to lower the charge.

BRIEF DESCRIPTION OF THE DRAWINGS

FIG. 6 is a view showing an example of displaying charging information.

FIG. 7 is a view showing an example of displaying charging information.

DETAILED DESCRIPTION OF THE PREFERED EMBODIMENTS

Figure 1:
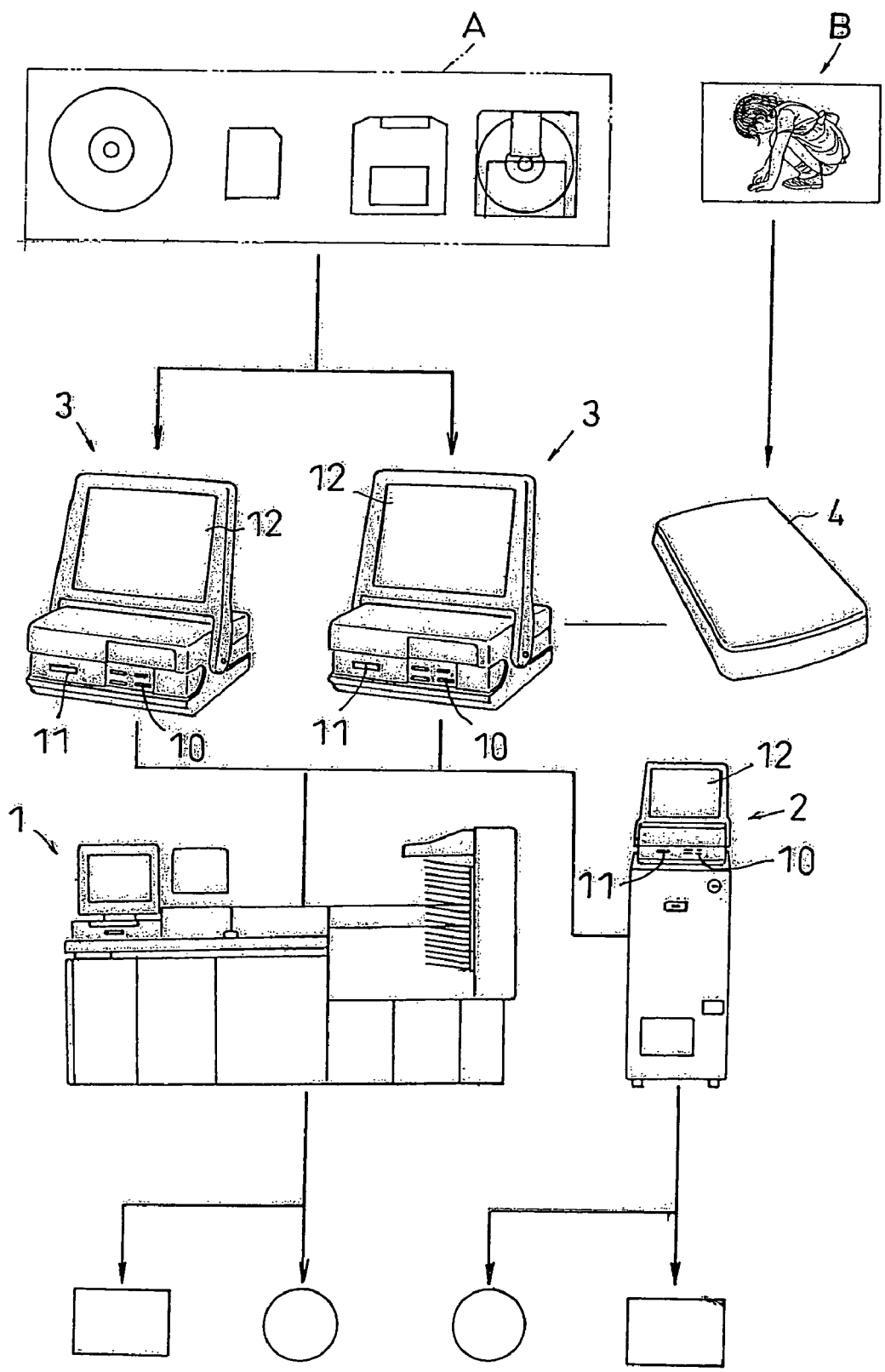
FIG. 1 is a schematic diagram showing a constitution of a photo processing system.

Preferred embodiments of the image receiving apparatus according to the present invention are described using drawings. FIG. 1 shows an overview of a photo processing system to be installed in a photo shop.

<Constitution of System>

This photo processing system is a system for performing image recording such as creation of a photo print and image writing on a storage medium. A photo processing apparatus 1 has the function of creating a photo print based upon image data and also the function of writing image data on a CD-R (one example of the storage media). The photo processing apparatus 1 reads a frame image having been formed in an already developed photo film, to digitize the read image. After image processing and the like have been performed on the acquired image data, the image is recorded. In the case of creating a photo print, the image data is transmitted to an exposure engine, and the image is then subjected to printing-exposure to a photographic sensitive material such as paper. By performing development processing on the paper with the image printing-exposed thereto, a photo print can be created. Further, the image data is transmitted to a medium writing apparatus so as to write an image data on a CD-R.

Further, the photo processing apparatus 1 is connected with later-described image receiving apparatuses 2 and 3 via a LAN, and thus can acquire image data received by the image receiving apparatus 2 or 3 via a network to perform image recording such as photo print creation based upon the acquired image data. The image receiving apparatuses 2 and 3 are operated by a customer, and capable of receiving image data, setting order contents, and doing other operations. The image receiving apparatus 2 itself has a function of an image creation printer, e.g. housing a thermal sublimation type printer. Hence the image receiving apparatus 2 can independently perform print processing regardless of other apparatuses connected to the network. The other image receiving apparatus 3 does not house a printer for image creation. When the image is to be recorded, data is transferred from the image receiving apparatus 3 to the photo processing apparatus 1 via the network, and the image is then recorded by the photo processing apparatus 1.

The image receiving apparatus 3 comprises a medium driving unit 10 (corresponding to image acquisition means), and is thus capable of taking thereinto image data housed in each of various media A. Examples of the media A may include a CD-R, a storage media for a digital camera and an MO disc. Further, by use of a flatbed scanner 4, image data can be acquired from a photo print B having no photo film. Each of the image receiving apparatuses 2 and 3 comprises a monitor 12 on the screen of which inputted image data can be displayed. Moreover, setting of order contents and the like can be performed using a touch panel provided on the monitor screen. Naturally, input means such as a keyboard or a mouse may also be provided.

Each of the image receiving apparatuses 2 and 3 comprises a receipt certificate issuing unit 11. When order contents are determined, a receipt certificate is printed out. Order contents, charging information, customer information and the like are printed on the receipt certificate. This receipt certificate is passed to a person in charge at a photo shop, and thereby image recording, payment of a charge, and the like, are performed.

<Constitution of Image Receiving Apparatus>

Figure 2:
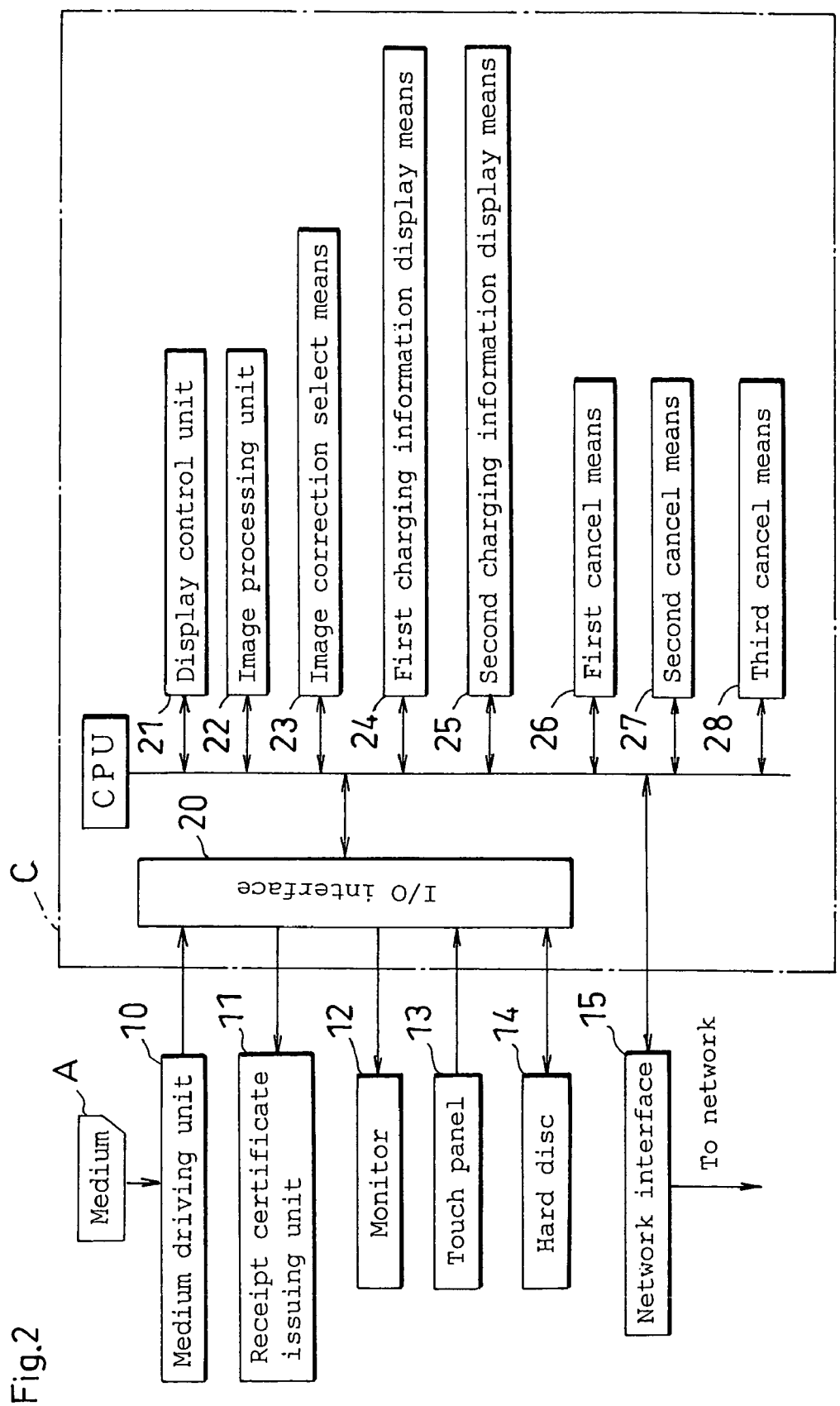
FIG. 2 is a block diagram explaining a function of an image receiving apparatus.

Next, the constitutions of the image receiving apparatuses 2 and 3 are described by use of a function block diagram of FIG. 2. The image receiving apparatuses 2 and 3 comprises a controller C, and is connected with hardware via an interface 20. Namely, the medium driving unit 10, the receipt certificate issuing unit 11, the monitor 12, a touch panel 13 and a hard disc 14 are connected via the interface 20. Image data acquired via the medium driving unit 10 is stored in the hard disc 14 along with order data on the image data. In the case of creating a photo print by use of the photo processing apparatus 1, the image data stored in the hard disc 14 is read at an appropriate timing, to be transmitted out into the network via a network interface 15.

A display control unit 21 controls display contents to be displayed on the monitor 12. This unit provides various display screens to facilitate the customer to perform order reception processing. An image processing unit 22 has the function of performing various kinds of image processing on image data. Examples of contents of image processing may include image correction such as color/density correction, red-eye correction, backlight correction, and trimming. In the case of creating a print, image processing is performed on original image data to produce image data for printing.

Image correction select means 23 has the function of selecting image correction, namely the function of selecting image correction on the monitor screen, which is wanted to be made to the image data. First charging information display means 24 has the function of displaying charging information on the selected image correction. Since image correction is made based upon a special function in the image processing unit and further a certain time is required for the image correction, a photo shop can make a setting for imposing an additional charge. There are various kinds of image correction, and charges can be set for the respective contents of image correction, or a flat charge can be set for each of the contents of image correction. Further, there may be image correction for which no additional charge is imposed. By the display of the charging information on the image correction, it is possible for the customer to be previously aware of the degree of a charge to be imposed on the selected image correction, and to use the displayed charging information as materials for determining whether to actually select the image correction or not.

Second charging information display means 25 has the function of specifically displaying charging information according to image recording order. For example, a basic charge for creating a photo print, a per-print charge, all charging information on selected image correction, and the like, are displayed. The charging information on the image correction can be displayed for each individual image (per frame). It is possible for the customer to be previously aware of the degree of a total cost by looking at the displayed charging information. It is also possible, after looking at the charging information, to take a measure such as canceling an order for image recording or canceling image correction.

First cancel means 26 has the function of canceling image correction when charging information on selected image correction is displayed by the first charging information display means 24. The image correction can for example be canceled due to an excessively high charge. Second cancel means 27 is capable of canceling order contents after the display of charging information by the second charging information display means 25. In this charging information displayed, a total charge for the image recording processing, a total charge for the image correction, and the like are included, and in view of those charge contents, the order itself may be cancelled.

Third cancel means 28 is capable of canceling image correction after the display of charging information by the second charging information display means 25. For example, after looking at a total charge for image correction, only the image correction can be cancelled. Even with the image correction cancelled, the order for image recording remains uncancelled, and thereby image recording processing such as photo print creation is executed. It should be noted that in cancellation of image correction, while image correction set to be made to images can be cancelled in one operation, it can also be canceled by frame unit. Further, each of the contents of image correction can be individually cancelled. For example, only the red-eye correction can be cancelled.

Each function of the controller C can be realized for example by the computer program.

<Print Receiving Procedure>

Figure 3A:
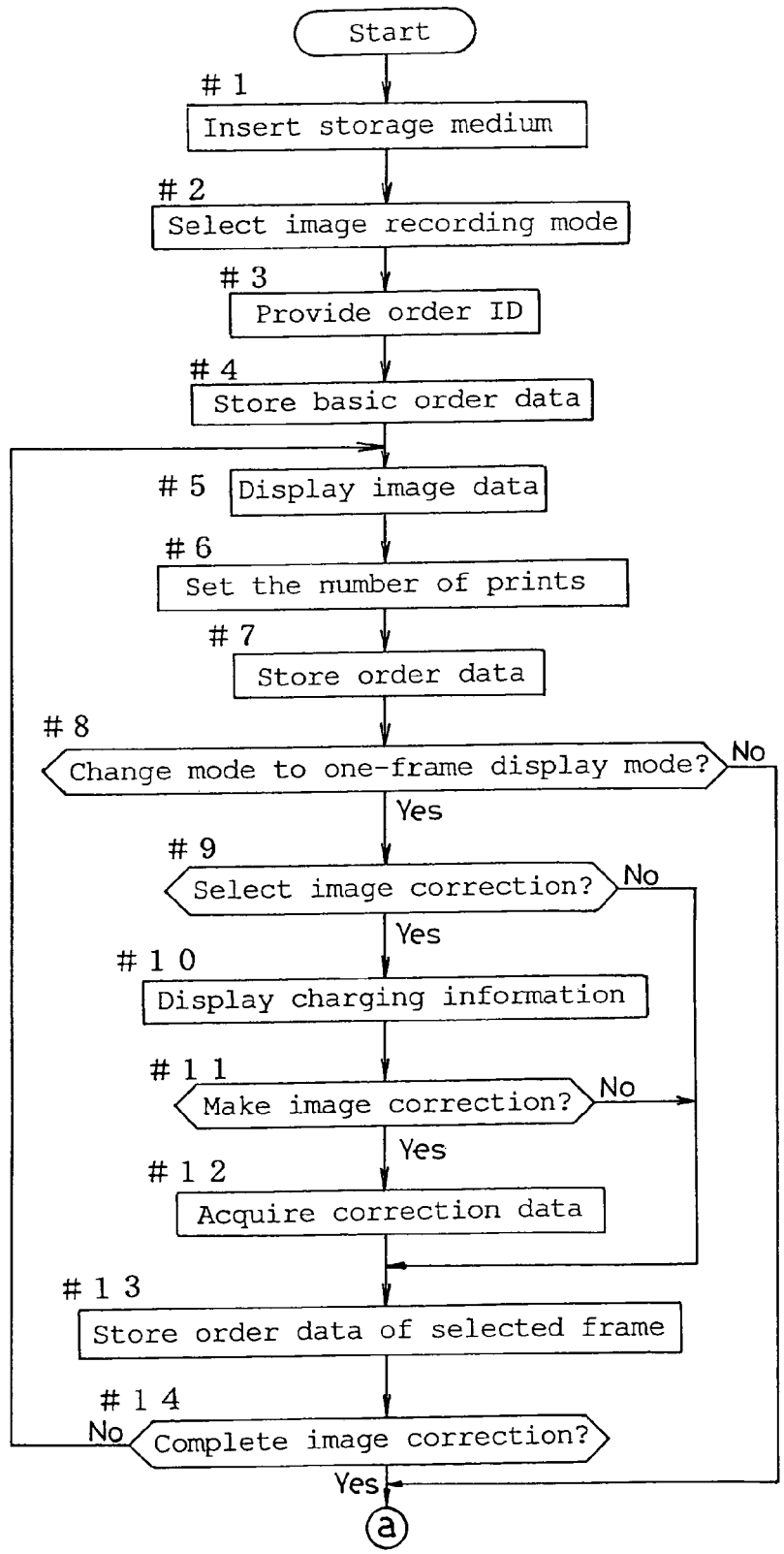
FIG. 3A is a flowchart showing a print receiving procedure.
Figure 3B:
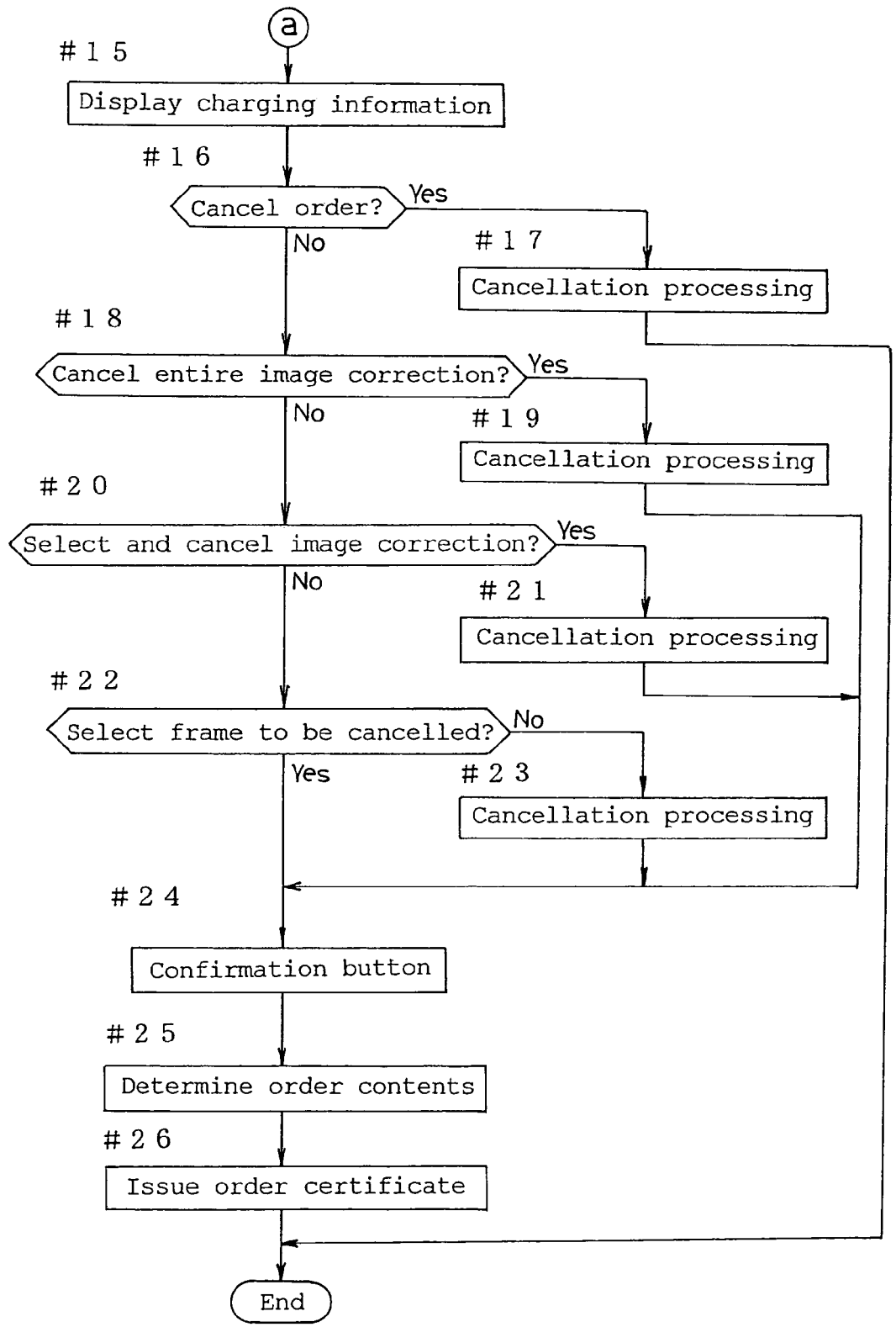
FIG. 3B is a flowchart showing a print receiving procedure.

Next, a procedure is described by flowcharts of FIGS. 3A and 3B in the case where the customer performs order reception of a photo print by use of the image receiving apparatuses 2 and 3. A photo print is created by use of the photo processing apparatus 1.

First, a storage medium is inserted from an inlet of the medium driving unit 10 (#1). Next, an image recording mode is selected (#2). The image recording includes processes such as photo print creation and image data writing to the storage medium, and the following description is given on the case of creating a photo print. It is to be noted that almost the same procedure is performed in the case of medium writing as in the case of photo print creation. Image data stored in the inserted storage medium is read and stored in the hard disc 14. Next, an order ID (reception number) is automatically provided (#3). The taken-in image data is stored in the hard disc 14 while in the state of being related to the order ID. In addition to the order ID, the kind of inserted storage medium, a print size of a photo print to be created and other customer information may be inputted as basic order data.

Figure 4:
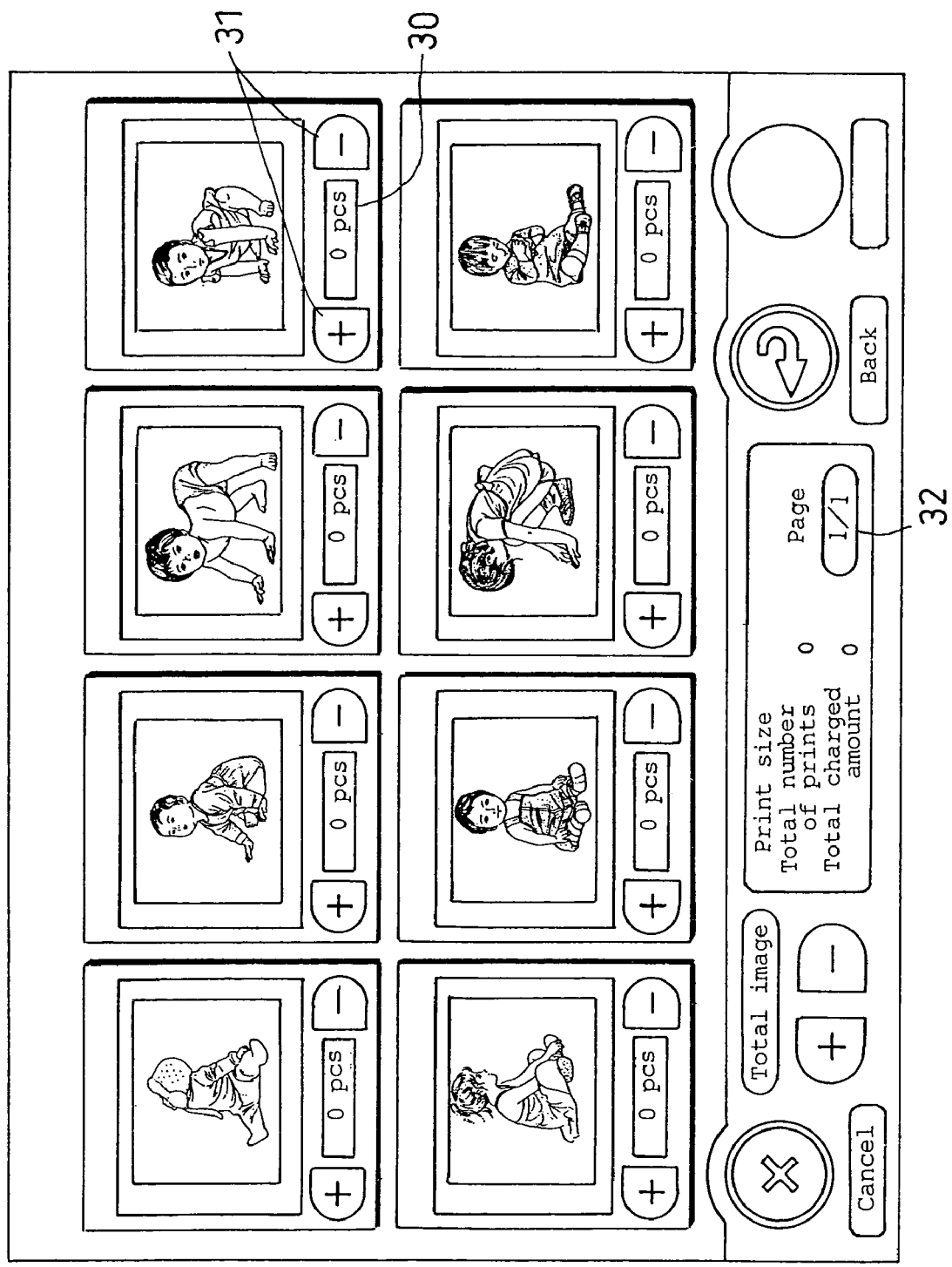
FIG. 4 is a view showing an example of displaying an image on a monitor screen.

Next, image data taken in the monitor 12 is displayed (#5). An example of this display is shown in FIG. 4. An image is displayed as a thumbnail image. Although eight images are displayed in this figure, the number of images to be displayed in one screen can be set as appropriate. A printing number display section 30 is provided under each image, which is set to zero by default. If there is an image wanted to be printed, that image is selected. The number of prints is then set by touching a printing number setting button 31 (#6). When not less than eight images exist, images other than those in the first page can be seen by touching a page button 32, and a setting can be made in the next page. The setting contents are stored as order data (#7).

FIG. 4 shows a mode in which eight images are displayed on the monitor 12, and this mode can be changed to a one-frame expanded display mode. For example, among the eight images being displayed in FIG. 4, a certain image is selected and double-clicked (double-touched) so that the image can be displayed in the one-frame display mode shown in FIG. 5 (#8). When image correction (image edition) is to be made, an appropriate button is touched (#9). This button functions as image correction select means. In this mode, as examples of the image correction, trimming, a sepia change, print framing, a backlight correction, a red-eye correction, and a color correction are cited. However, those examples do not restrict the kinds of image correction. Here, upon the touch of the red-eye correction button 33, charging information as shown in FIG. 6 is displayed. This is based upon the function of the first charging information display means 24.

As shown in FIG. 6, a charge in the case of making the red-eye correction is displayed. By looking at this screen, the customer can determine whether to make the red-eye correction or not. If the customer considers the charge as too high, the red-eye correction can be cancelled by touching the cancel button 34. The red-eye correction can be made by touching an OK button 35 (#11). When the OK button 35 is touched, correction data is acquired and the image displayed in FIG. 5 comes into a state where a red-eye is corrected (#12). Since the red-eye correction made here is for display on the monitor 12, its processing may be simpler than a red-eye correction processing to be performed when image data for printing is actually created. Namely, the correction required here may be in such a degree that the customer can confirm the red-eye correction has been made. This is because an image displayed on the monitor 12 is a thumbnail image and thus a resolution is high enough if the customer can confirm correction contents.

It is to be noted that image correction can be cancelled even after the OK button 35 has been touched. Correction data on the image is stored as part of order data (#13).

It should be noted that a plurality of kinds of image correction can be made with respect to one image. When a plurality of kinds of image correction are made, charges for the respective kinds of image correction are added. In this case, it is preferable to provide a charge display section 37 for displaying a total charge for image correction to be made to the image. Further, the screen may be constituted not to charge for all kinds of image correction but to charge in accordance with contents of image correction. For example, a constitution may be employed in which the color correction is not charged for.

Figure 5:
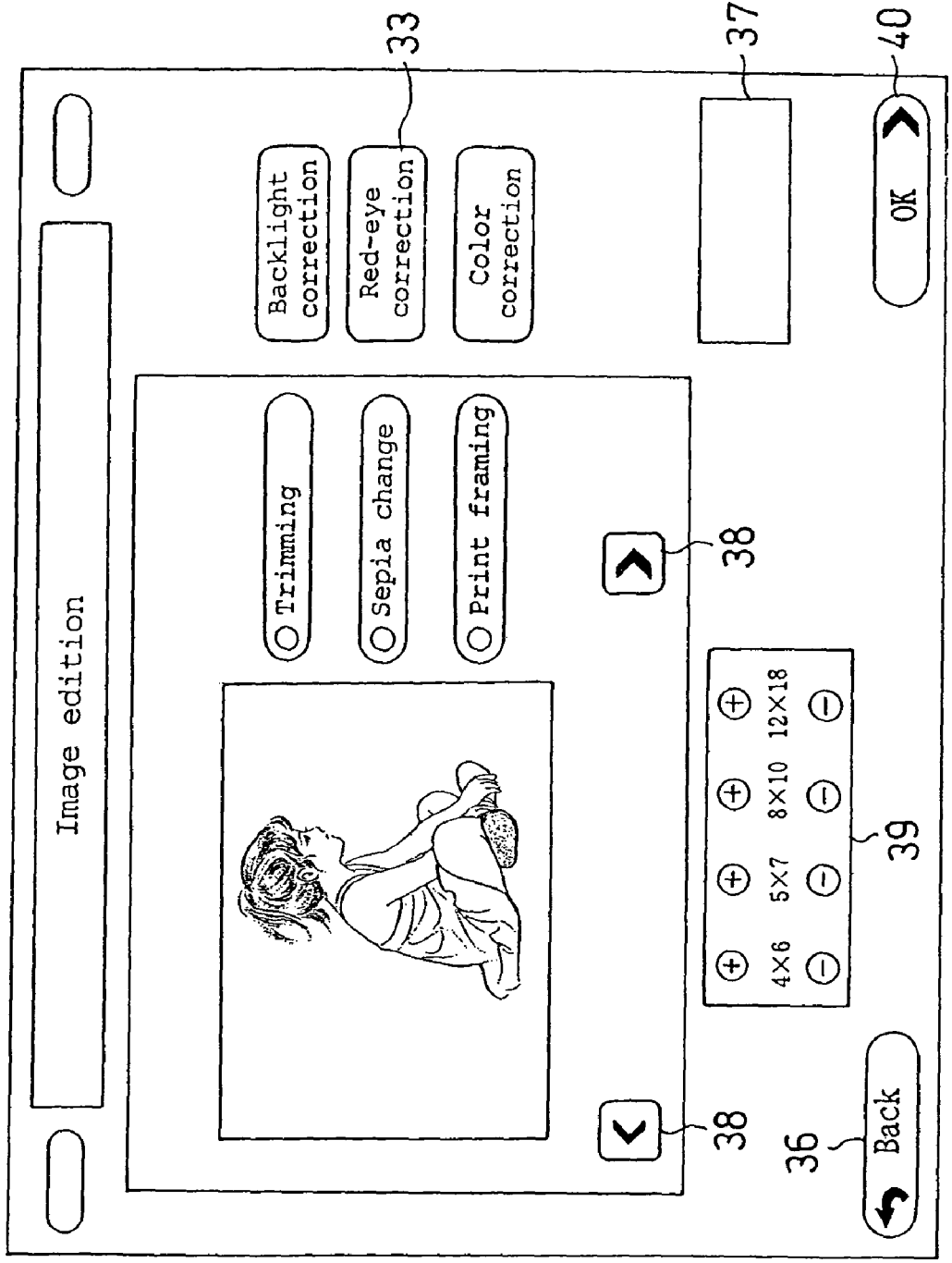
FIG. 5 is a view showing a constitutional example of a screen displaying one frame.

By touching a back button 36 on the screen of FIG. 5, the screen can be returned to the eight-frame display screen shown in FIG. 4. Further, when other images are wanted to be displayed in the one-frame display screen, the screen can be moved to the one-frame display screen by touching a cursor button 38. Moreover, when a print size is wanted to be changed, the print size setting can be changed by a size setting unit 39. When the image correction is all completed, an OK button 40 is touched (#14).

Thereby, charging information as shown in FIG. 7 is displayed on the monitor screen (#15). This is based upon the function of the second charging information display means 25. The charging information displayed here is one order's worth of information where a total charged amount and other detailed charging information are displayed altogether. One order represents an image recording order with respect to one storage medium, but one order unit is not restricted thereto. A thumbnail image 46 of each frame image is also displayed. After looking at this charging information, the order itself can be cancelled (#16). The order can be cancelled by touching a cancel button 40 (#17). Canceling can be made individually. The total charged amount for the image correction is displayed as the charging information, and the entire image correction can be cancelled (#18). This cancellation can be made by touching a cancel button 41 (#19).

In stead of canceling the entire image correction, some of the image correction can be selected for cancellation. For example, only the red-eye correction can be cancelled (#20). A button for the kind of image correction wanted to be cancelled may be selected from cancel buttons 42 and touched (#21). Further, the canceling may not be made by image correction unit, but by frame unit (#22). By touching a cancel button 43, image correction for the frame can be cancelled. Further, by touching a cancel button 44 provided for each frame, printing of the selected frame can be cancelled. Although various canceling methods were described above, the order of cancellation or the like can be appropriately changed.

Upon completing confirmation of the charging information, if there is no problem, a confirmation button 45 is touched (#24), to determine order contents. The determined order data is stored again in the hard disc 14 (#25). The confirmation button 45 functions as order contents determination means. Thereafter, a receipt certificate is issued by the receipt certificate issuing unit 11. On the receipt certificate printed are contents of the order data, charging information described using FIG. 7, and the like. Thereby, the reception processing is completed. The customer should just pass the receipt certificate to a person in charge at a photo shop. The person in charge reads data stored in the hard disc 14 via the network at an appropriate timing, and creates a photo print by use of the photo processing apparatus 1.

Another Embodiment

Although the example of the case of creating a photo print by use of the photo processing apparatus 1 was described in the present embodiment, the processing according to the present invention is not restricted thereto. The present invention can also be applied to the case of writing image data on a storage medium by use of the photo processing apparatus 1. Similarly, the present invention can also be applied to the case of creating a photo print with the printer provided in the image receiving apparatus 3 or writing an image on the storage medium.

The monitor screen is preferably constituted such that a setting for each frame image can be made again after the charging information shown in FIG. 7 has been displayed. For example, when image correction is wanted to be made, or wanted to be made again, to a specific frame image, the screen is moved to the one-frame display screen as shown in FIG. 5 by touching the thumbnail image 46 of the specific frame image so that image correction can be made again.

What is claimed is:

1. An image receiving apparatus creating an order for photo printing, comprising:
    image acquisition means for acquiring image data;
    display control means for displaying the acquired image data on a monitor screen;
    image correction select means for selecting one kind or plural kinds of image correction to be made to one frame's worth of image data among the acquired image data;
    image correction means for correcting the acquired image data;
    first charging information display means for displaying charging information on the selected image correction which is selected by the image correction select means;
    first cancel means for canceling selected image correction after the display of the charging information by the first charging information display means, when selected image correction is to be canceled;
    order contents determination means for determining order contents for image recording processing based upon all the image data acquired;
    second charging information display means for displaying all the charging information on at least the image correction, prior to determination of the order contents; and
    second cancel means for canceling order contents determination when order contents determination is to be canceled and third cancel means for canceling image correction when image correction is to be canceled, said second and third cancel means being both accessible on the display of the charging information by the second charging information display means, if required;
    wherein the second charging information is displayed upon approval of order contents based on a cancelation of the third cancel means.

2. The image receiving apparatus according to claim 1, wherein the second charging information display means displays charging information on image correction per frame.

3. The image receiving apparatus according to claim 1, wherein the third cancel means can cancel image correction by frame unit.

4. The image receiving apparatus according to claim 1, wherein the third cancel means can cancel image correction in one operation.

5. The image receiving apparatus according to claim 1, wherein the third cancel means can cancel each of the contents of image correction individually.

6. An image receiving apparatus creating an order for photo printing, comprising:
    image acquisition means for acquiring image data composed of at least one frame's worth of image data;
    display control means for displaying the acquired image data on a monitor screen;

image correction select means for selecting on the monitor screen at least one kind of image correction to be made to one frame's worth of image data among the acquired image data;

image correction means for correcting the acquired image data;

first fee information display means for displaying, on the monitor screen, fee information on each selected image correction;

first cancel means for canceling any of the selected image correction(s) after the display of the fee information by the first fee information display means, if required;

second fee information display means for displaying, on the monitor screen, all the fee information on all the image correction(s);

second cancel means for canceling any of the order-contents determination when any of the order-contents of the image correction(s) is to be canceled and third cancel unit for canceling any of the image correction(s) when any of the image correction(s) is canceled, said second and third cancel means being both accessible on the display of the fee information by the second fee information display means,; and order-contents determination means for determining, on the monitor screen, order contents for image processing and recording based upon all the image data acquired, wherein the fee information is displayed upon approval of order contents based on a cancelation of the third cancel unit.

7. The image receiving apparatus according to claim 6, wherein the second fee information display unit displays fee information on image correction per frame.

8. The image receiving apparatus according to claim 6, wherein the third cancel unit is configured to cancel any of the image correction(s) per frame.

9. The image receiving apparatus according to claim 6, wherein the image data are composed of multiple frames' worth of image data.

10. The image receiving apparatus according to claim 6, wherein the monitor screen is a touch panel.

11. The image receiving apparatus according to claim 6, further comprising a printing means for printing the processed image data based on the determined order contents.

12. A method for receiving an image, comprising:
acquiring image data onto a computer monitor screen;
displaying the acquired image data on the computer monitor screen;
selecting one kind or plural kinds of image correction to be made to one frame's worth of image data among the acquired image data;
displaying charging information on the selected image correction;
canceling selected image correction after the display of the charging information, if required;
determining order contents for image recording processing based upon all the image data acquired;
displaying all the charging information on at least the image correction, prior to determination of the order contents;
canceling order contents determination after the display of the charging information, if required;
correcting the acquired image data if required; and
canceling image correction after display of the charging.

13. The method according to claim 12, further comprising canceling image correction after the display of the charging.

14. A method for receiving apparatus, comprising:
acquiring image data composed of at least one frame's worth of image data;
displaying the acquired image data on a monitor screen;
selecting on the monitor screen at least one kind of image correction to be made to one frame's worth of image data among the acquired image data;
displaying, on the monitor screen, fee information on each selected image correction;
canceling any of the selected image correction(s) after the display of the fee information, if necessary;
displaying, on the monitor screen, all the fee information on all the image correction(s);
determining, on the monitor screen, order contents for image processing and recording based upon all the image data acquired;
canceling any of the order-contents determination and/or canceling any of the image correction(s), after the display of the fee information, if necessary; and
correcting the acquired image data if required.

15. The method according to claim 14, further comprising composing the image data in multiple frames' worth of image data.

16. The method according to claim 14, wherein the monitor screen is a touch panel.

17. The method according to claim 14, further comprising printing the processed image data based on the determined order contents.

* * * * *